(12) United States Patent
Uhlik et al.

(10) Patent No.: US 7,586,655 B1
(45) Date of Patent: Sep. 8, 2009

(54) ACQUIRING AND USING THREE-DIMENSIONAL INFORMATION IN A DOCUMENT SCANNING SYSTEM

(75) Inventors: Christopher R. Uhlik, Danville, CA (US); Joseph K. O'Sullivan, San Francisco, CA (US); Marc Levoy, Stanford, CA (US)

(73) Assignee: Google Inc., Mountain View, CA (US)

( * ) Notice: Subject to any disclaimer, the term of this patent is extended or adjusted under 35 U.S.C. 154(b) by 842 days.

(21) Appl. No.: 10/611,666

(22) Filed: Jun. 30, 2003

(51) Int. Cl.
*H04N 1/04* (2006.01)

(52) U.S. Cl. .................. 358/497; 358/498; 358/474

(58) Field of Classification Search .............. 358/498, 358/497, 474; 382/112, 275
See application file for complete search history.

(56) References Cited

U.S. PATENT DOCUMENTS

| | | | |
|---|---|---|---|
| 2,406,152 A | | 8/1946 | Levine |
| 4,356,390 A | * | 10/1982 | Feilchenfeld ............... 235/455 |
| 5,185,821 A | | 2/1993 | Yoda |
| 5,636,006 A | | 6/1997 | Wu |
| 5,640,252 A | | 6/1997 | Turner et al. |
| 5,777,660 A | | 7/1998 | Ard |
| 5,835,241 A | * | 11/1998 | Saund ....................... 358/488 |
| 5,886,342 A | | 3/1999 | Matsui |
| 6,124,950 A | | 9/2000 | Honda |
| 6,491,278 B1 | | 12/2002 | Thomsen |
| 6,493,469 B1 | | 12/2002 | Taylor |
| 6,762,862 B2 | | 7/2004 | Lam et al. |
| 7,113,619 B1 | * | 9/2006 | Matama ..................... 382/112 |
| 7,224,472 B2 | * | 5/2007 | Bauch et al. ................ 356/611 |
| 2003/0086721 A1 | | 5/2003 | Guillemin et al. |
| 2004/0047009 A1 | * | 3/2004 | Taylor et al. ................ 358/498 |

OTHER PUBLICATIONS

Transaction History from PAIR printed Apr. 07, 2009, for U.S. Appl. No. 10/611,681.
Transaction History from PAIR printed Apr. 07, 2009, for U.S. Appl. No. 10/611,408.
Transaction History from PAIR printed Apr. 07, 2009, for U.S. Appl. No. 10/713,662.

* cited by examiner

*Primary Examiner*—Houshang Safaipour
(74) *Attorney, Agent, or Firm*—Fish & Richardson P.C.

(57) ABSTRACT

Systems and methods for acquiring and using three-dimensional imaging data to improve the process of scanning bound documents are disclosed. The system includes a camera for capturing an image of documents such as books, and a second camera for gathering data regarding the first camera's field of view. Signal processing logic analyzes the data gathered by the second camera and uses it to determine whether the imaging camera's view was obstructed. If it is determined that the imaging camera's view was obstructed, then remedial action can be taken, such as removing the obstruction, recapturing the image, and/or flagging the image for further processing. The second camera may include a laser range finder, a scanning laser range finder, an ultrasonic range finder, a device that utilizes auto-focus range finding technology, a binocular camera array, and/or a trinocular camera array.

25 Claims, 6 Drawing Sheets

ACQUIRING AND USING THREE-DIMENSIONAL INFORMATION IN A DOCUMENT SCANNING SYSTEM

CROSS REFERENCE TO RELATED APPLICATIONS

This application is related to co-pending U.S. patent application Ser. No. 10/611,408 entitled "Movable Document Cradle for Facilitating Imaging of Bound Documents", and U.S. patent application Ser. No. 10/611,681 entitled "Pacing and Error Monitoring Of Manual Page Turning Operator", filed concurrently herewith, which are incorporated herein by reference in their entireties.

BACKGROUND OF THE INVENTION

1. Field of the Invention

The present invention relates generally to scanning bound documents. More specifically, systems and methods for acquiring and using three-dimensional imaging data to improve the process of scanning bound documents are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the Library of Congress, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner.

A problem with such techniques is that obstructions may appear between the document and the camera or other device that is used to obtain an image of the document. This can reduce the effectiveness and/or throughput of large scanning jobs, since the inaccurate and/or ineffective scanning of one or more pages can undermine the reliability of information search and retrieval based on the results of the scanning process, and renders the scanned version of the document an ineffective and incomplete tool for archival purposes.

Accordingly, systems and methods are needed for facilitating the scanning of bound documents in a manner that minimizes document wear-and-tear, and yet is relatively efficient and/or error-free.

SUMMARY OF THE INVENTION

Systems and methods for acquiring and using three-dimensional imaging data to improve the process of scanning bound documents are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a document scanning system is provided. The system includes at least one camera for capturing an image of documents such as books, periodicals, and the like, and at least a second camera for gathering data regarding the first camera's field of view. Signal processing logic analyzes the data gathered by the second camera, and uses it to determine whether the imaging camera's view was obstructed. If it is determined that the imaging camera's view was obstructed, then remedial action can be taken, such as removing the obstruction, recapturing the image, and/or flagging the image for further processing. In one embodiment, the second camera may include a laser range finder, a scanning laser range finder, an ultrasonic range finder, a device that utilizes auto-focus range finding technology, a binocular camera array, and/or a trinocular camera array.

In another embodiment, a method for scanning bound documents is provided. An array of one or more cameras is used to capture an image of a document. A second array of cameras or other devices are also used to collect data regarding the document and region between the document surface and the first camera array. These data are then processed to determine whether any obstructions or other error conditions might have interfered with the first camera array's attempt to capture an image of the document. If any such obstructions or error conditions are detected, remedial action can be taken. In some embodiments, the process of detecting the presence of obstructions or error conditions includes comparing the data collected by the second array of cameras to an idealized data model of a hypothetical document and the region between the hypothetical document and the first camera array. Differences between the actual data collected by the second array and the idealized model are analyzed to determine whether they indicate the presence of obstructions or other error conditions.

In yet another embodiment, a method for scanning a bound document is provided. The document is positioned on a cradle located beneath an array of one or more cameras. The array of cameras is used to capture an image of the bound document. A second array of one or more cameras is used to capture an image of the bound document and the region between the surface of the bound document and the first camera array. The image captured by the second camera array is then compared to data representing a hypothetical, bound document and the region between the surface of the hypothetical, bound document and the first camera array. Differences between the captured data and the data model can then be analyzed to detect the presence of obstructions or other error-causing conditions, such as warped pages, an incorrectly positioned document, or the like.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for acquiring and using three-dimensional imaging data to improve the process of scanning bound documents are disclosed. The following description is presented to enable any person skilled in the art to make and use the invention. Descriptions of specific embodiments and applications are provided only as examples, and various modifications will be readily apparent to those skilled in the art. The general principles described herein may be applied to other embodiments and applications without departing from the spirit and scope of the invention. Thus, the present invention is to be accorded the widest possible scope, encompassing numerous alternatives, modifications, and equivalents consistent with the principles and features disclosed herein. For purpose of clarity, technical details that are known in the fields related to the invention have not been described in detail so as not to unnecessarily obscure the present invention.

Figure 1:
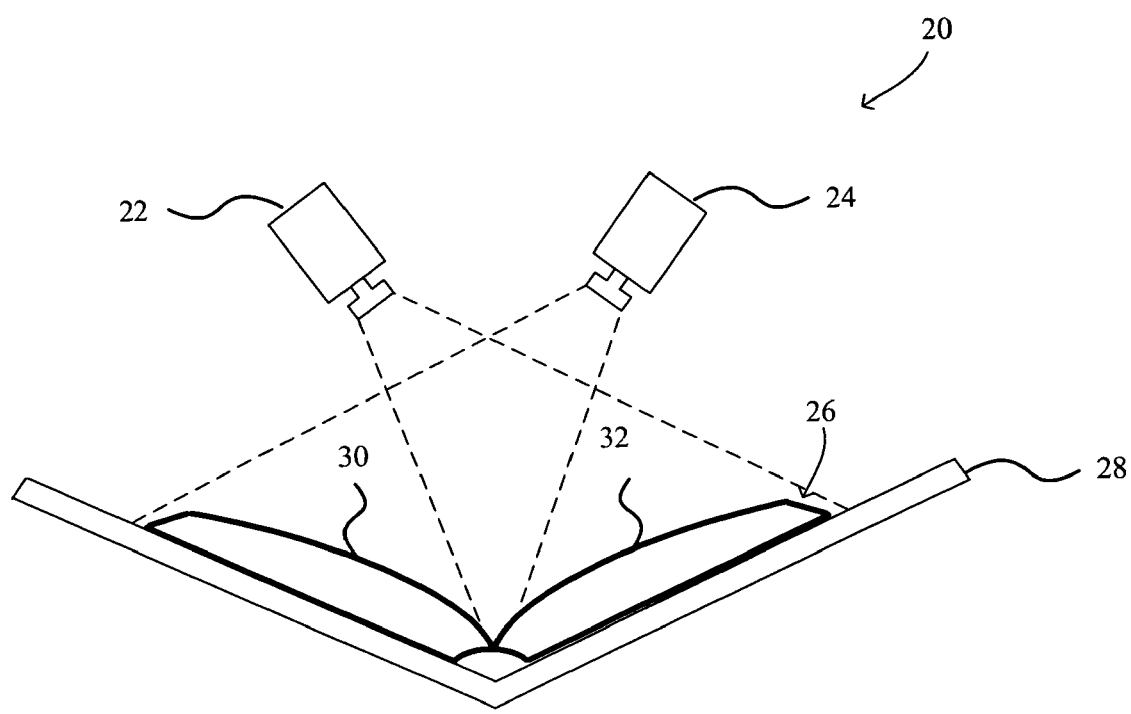
FIG. 1 is a schematic diagram of an exemplary image-capture system.

FIG. 1 is a schematic diagram of an exemplary system 20 for scanning bound documents. As shown in FIG. 1, a document such as a book 26 is placed on a cradle 28 (such as a table top, or mechanical device specially adapted for holding books and other documents), and opened to facing pages 30, 32 which a system operator wishes to convert into electronic form. One or more cameras 22, 24, such as high resolution cameras, take digital pictures of pages 30, 32, and these pictures are then processed using optical character recognition (OCR) techniques to produce an editable and/or searchable version of the document's text.

In order to scan additional pages of the document 26, it is necessary to open the document 26 to each such page so that an image can be taken. This can be done manually by the system operator, or automatically using a robot arm or other mechanical mechanism. In embodiments in which the document pages are turned automatically, it will often be desirable for the camera(s) 22, 24 to take pictures automatically at predefined time intervals, synchronized to match the pace of the automatic page-turning mechanism. Even in embodiments where the system operator turns the pages manually, it may still be desirable for the camera(s) to take pictures automatically (e.g., at predefined intervals) in order to increase the speed at which a document can be scanned by obviating the need for additional manual steps (e.g., the step of manually triggering the cameras).

When scanning a large document in its entirety (or a substantial portion thereof), it will generally be desirable to process each page as quickly as possible, with relatively little human supervision. It will thus be desirable to automate the process to a high degree, and/or to reduce the level of skill required of any human operators.

A problem with a scanning process such as that illustrated in FIG. 1 is that camera(s) 22, 24 may be inadvertently blocked when taking a picture of a given page, thus resulting in a failure to obtain an accurate and/or complete image of the page. If such an obstructed picture goes undetected, or unremedied, it can lead to error, data loss, and/or customer dissatisfaction when the incompletely and/or inaccurately scanned text is later used as a search tool or as a backup of the original, or if it is marketed to consumers as an accurate and complete copy of the original.

It may be possible to reduce such errors by slowing the scanning process down, and/or by relying more heavily on human intervention (or more highly skilled human intervention) to ensure that each page is correctly positioned well in advance of camera activation, and to ensure that any obstruction to each camera's view is removed. Alternatively, or in addition, the entire text of each document could be reviewed, word-by-word, by human readers once scanning is complete. A problem with such approaches, however, is that they are likely to be time-consuming and expensive, and, due to their reliance on human attentiveness, may nevertheless fail to prevent or detect a substantial number of errors.

Figure 2:
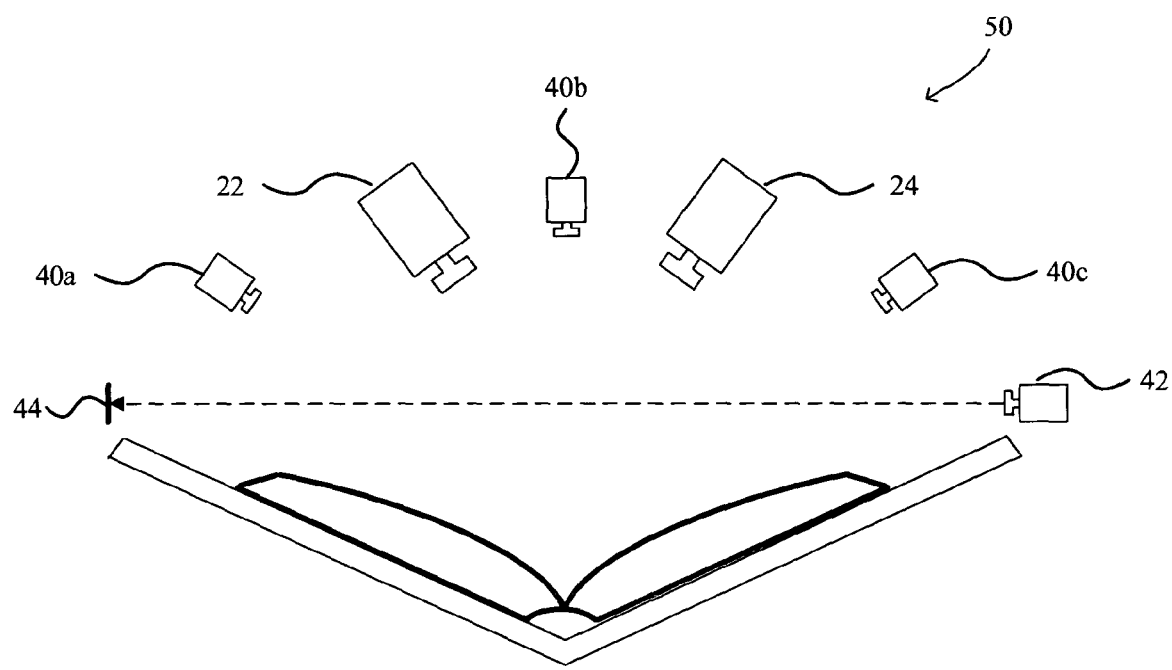
FIG. 2 is a schematic diagram of an exemplary image-capture system that acquires and uses three-dimensional shape information for error detection.

FIG. 2 is a schematic diagram of an exemplary image-capture system that acquires and uses three-dimensional shape information to automatically detect and optionally correct obstructions and/or other problems with the images obtained by camera(s) 22, 24. As shown in FIG. 2, one or more additional cameras 40a, 40b, 40c, 42 may be employed to obtain three-dimensional (or quasi-three-dimensional) spatial data that can be used to detect obstructions in the field of vision of camera(s) 22, 24. The three-dimensional data gathered by cameras 40, 42 may undergo relatively sophisticated signal processing to obtain additional information about the nature of any obstructions, or relatively simple signal processing could be used to make a yes/no decision as to whether any obstructions were present. For example, the signal from camera 42 might simply detect obstructions in camera 42's line of sight to target 44, without undergoing further signal processing. Indeed, such a camera 42 may be a laser beam or ultrasound device. Alternatively or additionally, one or more cameras 42 may be operable to capture an edge view of the document, which can be compared to the edge view of a nominal, idealized document using signal processing techniques, thereby enabling detection of unusual or undesirable profiles. In any event, upon detection of an obstruction or other special condition, the imaging data for a page can be flagged for later remediation, and/or the human or machine supervisor of the scanning process can be alerted to the error so that the page can be rescanned.

The imaging data collected by systems such as that shown in FIG. 2 can also (or alternatively) be used to detect other errors or special conditions during the imaging process. For example, the imaging data collected by cameras 40, 42 can be used to determine whether the document, and/or page, is positioned correctly relative to the image plane(s) of the camera(s) 22, 24; whether the page contains any special features (such as pop-up text) requiring special attention; whether the end of the document has been reached (e.g., by detecting that the document is shut); and/or the like.

It should thus be appreciated that FIG. 2 is provided for purposes of illustration, and that numerous modifications could be made to the system shown in FIG. 2 without departing from the spirit or scope of the present invention. For example, although FIG. 2 shows one set of cameras 40, 42 being used for purposes of detecting obstructions to the field of view of another set of cameras 22, 24, it will be appreciated that in other embodiments some or all of these cameras may perform both roles (i.e., obtaining imaging data and assisting in the detection of obstructions or other special conditions). In addition, although FIG. 2 shows two cameras being used for imaging, and four cameras being used to gather three-dimensional data, it should be appreciated that any suitable number of cameras can be used for the image collection and/or three-dimensional data gathering. For example, a single camera could be employed to image the document, and a single camera could be used to detect obstructions. Generally speaking, however, the greater the number of cameras used to collect the three-dimensional data, the richer the information regarding obstructions and other issues that will be obtainable.

Figure 3:
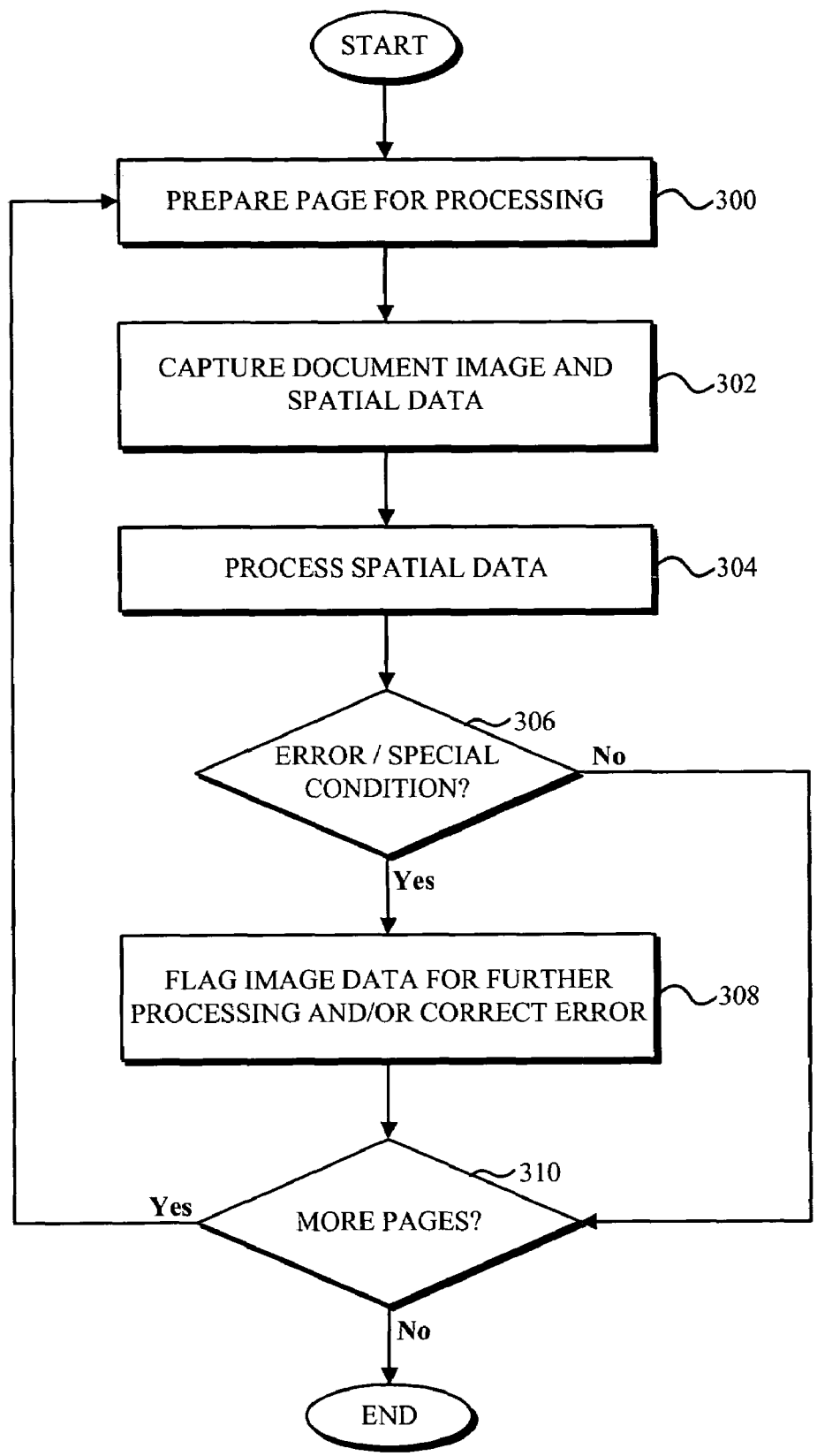
FIG. 3 is a block diagram illustrating a method for acquiring and using three-dimensional imaging data to improve the process of scanning bound documents.

FIG. 3 illustrates a process for using three-dimensional imaging data to detect and optionally correct errors and/or special conditions in a document imaging process. Note that although for ease of explanation the imaging data that is used for detecting errors and special conditions will often be referred to as "three-dimensional" data, this data need not be three-dimensional in a literal sense. For example, in a simple embodiment, data from a single camera or other data collection source could comprise the "three-dimensional" data that is used.

Referring to FIG. 3, a document is scanned by positioning it under the imaging camera(s) at step 300. An image of the document is then captured, as is three-dimensional imaging data regarding the space surrounding the document at step 302. The three-dimensional data is then sent to a signal processor for processing at step 304. If the signal processing detects an obstruction and/or other special condition (i.e., a "Yes" exit from decision block 306), then the imaging data for that page is flagged for further processing and/or corrected at step 308. For example, depending on the nature of the condition that is detected, the image data for that particular page could be recaptured, or reprocessed using special signal processing techniques, or simply flagged for manual proofreading. Certain automated remedial measures can be employed at step 308 such as by using software to modify the captured image data and/or by physically correcting the source of the problem.

Referring once again to FIG. 3, if an error or other condition is not detected (i.e., a "No" exit from decision block 306), then the next page can be scanned, the process repeating itself until no more pages remain to be imaged.

An advantage of the process shown in FIG. 3 is that potential errors are detected as they occur, thereby allowing immediate remediation. For example, a human or machine operator could be alerted at step 308 to simply recapture the image for the particular page, thereby obviating the need to later return to that page to capture a better image (if the error is detected at all). The spatial data processing may also alert the operator of the need to reposition the document and/or the imaging cameras, thereby preventing the collection of an entire document's worth of useless data due to a careless initial placement of the document under the imaging cameras. Alternatively, some or all of the errors or special conditions detected at step 306 could be processed at a later time. For example, if it is determined that a page contains a pop-up image, the scanning system may return to that page at a later time so that it can apply specialized image capture techniques (e.g., additional, or repositioned, cameras). In sum, the automatic error detection provided by embodiments of the present invention facilitates efficient quality control over the imaging process.

Figure 4:
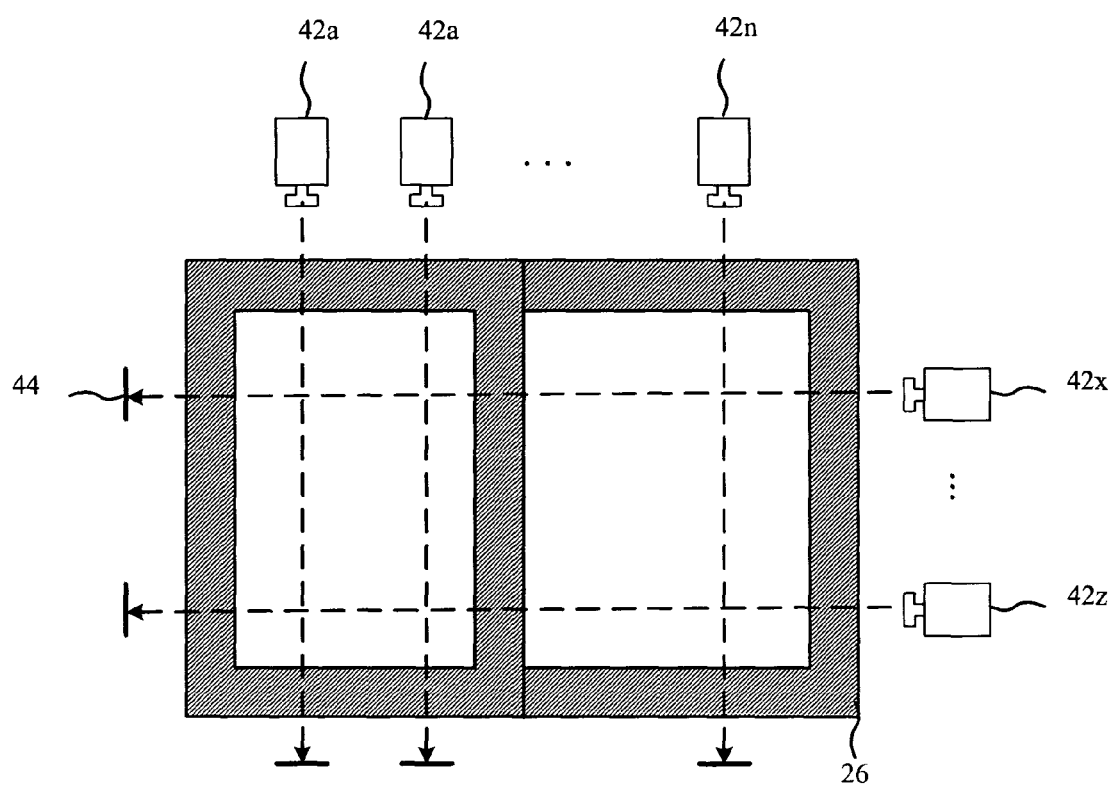
FIG. 4 is a schematic diagram on another exemplary image-capture system.

As previously indicated, any of a wide variety of techniques can be used to collect the three-dimensional data used to detect obstructions. One such technique makes use of a set of one or more cameras or lasers oriented in one or more planes parallel to the face of the document. FIG. 4 shows an example of one such arrangement. As shown in FIG. 4, detection devices such as cameras or lasers 42 . . . 42z are operable to detect obstructions to their field of view. By using a matrix of such devices, the document scanning system can obtain detailed information about the nature and location of any obstruction to the face of document 26. In some embodiments, multiple matrices of detection devices can be stacked vertically in relation to the page surface, and/or the detection devices in a single matrix can be distributed at different heights, thereby enabling detection of obstructions anywhere between the page surface and the image capturing cameras. In other embodiments, scanning lasers could be used instead of, or in addition to, a static array of lasers such as that shown in FIG. 4.

In other embodiments, other mechanisms could be used to gather three-dimensional information. For example, incomplete three-dimensional information obtained by, e.g., one or more ultrasonic, laser, and/or auto-focus range finding devices can be combined with a model of an idealized document (e.g., book) to determine whether potential obstructions are present between the document's surface and the imaging camera(s). For example, the scanning system can determine whether the distance to the closest object detected by the range finding device(s) is less than the distance to the hypothesized surface of a properly positioned model book. The detection of an object within the predefined range could indicate a potential error condition that might comprise the effectiveness of the imaging process. Such a technique need not involve a high degree of signal processing—simply examining the output of the range finder could suffice—yet can be quite effective in detecting a wide-range of obstructions or other error conditions, such as an operator's hand, a page that has not settled into its proper position, an oversized document, a wrinkled or distorted page, and the like.

Figure 5:
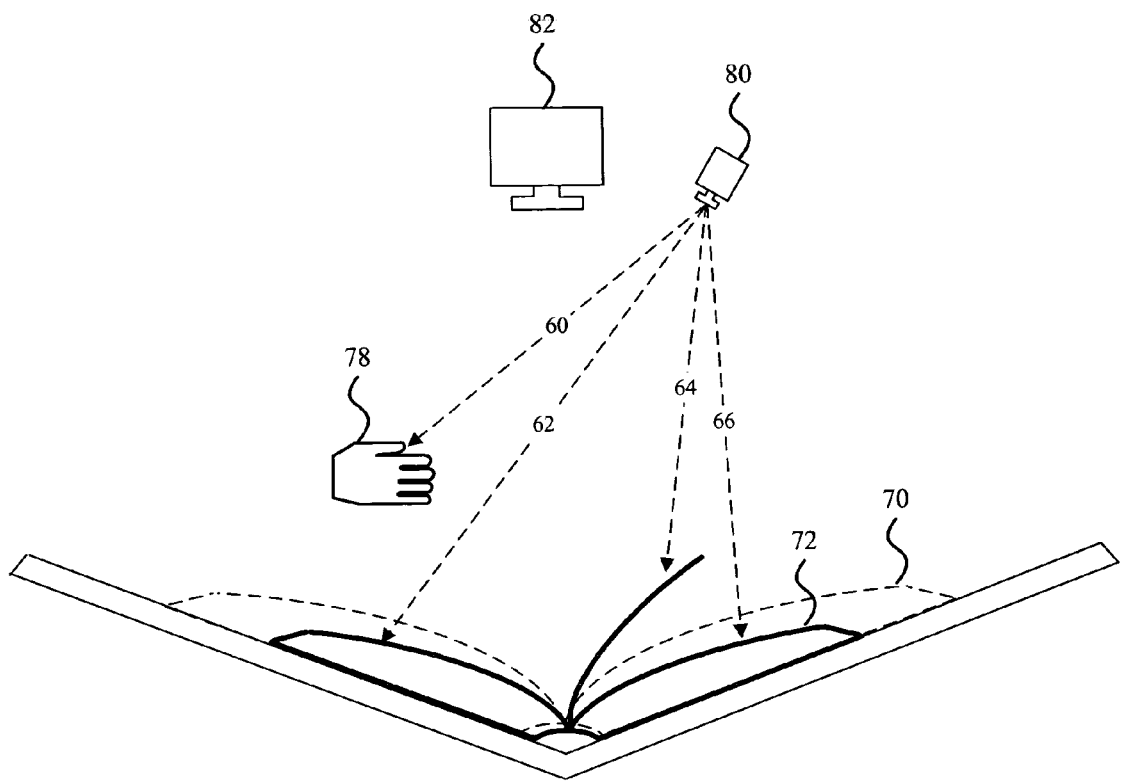
FIG. 5 is a schematic diagram of an exemplary image-capture system that uses range-finding technology to detect obstructions.

An example of such an arrangement is shown in FIG. 5. A model of an idealized book 70 is used by the document scanning system's signal processing logic to interpret the data obtained by scanning range-finding laser 80. Laser 80 preferably collects its data at approximately the same time as imaging camera 82 captures the image of an actual document 72. A potential error condition may be detected, for example, if the distance detected by the range-finding laser 80 at a particular point is less than the distance from the laser to the outline of the idealized book 70 at that point. In FIG. 5, for example, the operator's hand 78 blocks laser beam 60 from reaching the document 72. The system detects this obstruction by comparing the length of ray 60 to the distance between laser 80 and the idealized book 70 at that angle. The obstruction caused by the incompletely turned page at ray 64 would be detected in the same manner. Rays 62 and 66, on the other hand, reach the surface of the actual document 72. Because the length of each of these rays is greater than the corresponding distance between the laser 80 and the idealized book 70, no obstruction is deemed to exist between the surface of book 72 and imaging camera 82 at these angles.

Thus, it should be appreciated that any of a variety of techniques (or combinations thereof) could be used to gather the spatial data used to detect error conditions during the imaging process, non-limiting examples of which include, stereo, trinocular, and other multi-camera arrangements; scanning laser range finders; simple laser range finders; ultrasonic range finders; auto-focus range determination technology; sparse point maps; and/or the like.

Figure 6:
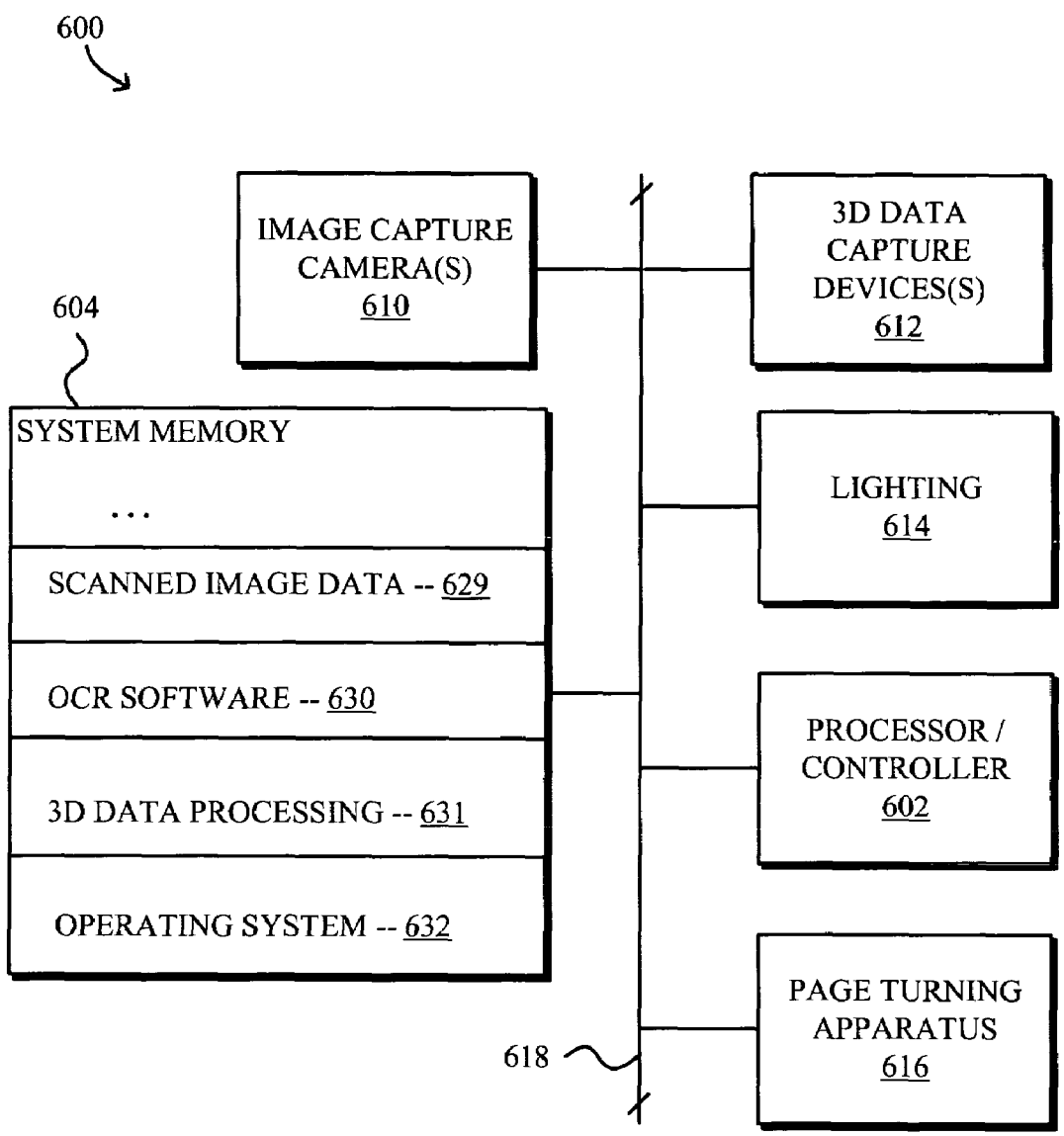
FIG. 6 is a block diagram of a system for acquiring and using three-dimensional imaging data to improve the process of scanning bound documents.

FIG. 6 shows a detailed block diagram of an illustrative document scanning system. As shown in FIG. 6, scanning system 600 may include a processor 602, system memory 604, one or more cameras 610 for capturing document images, one or more devices 612 for collecting three-dimensional spatial information, a mechanism 614 (e.g., a flash, array of lamps, etc.) for controlling the lighting of the document surface, an apparatus 616 for turning document pages automatically, and a bus 618 for connecting the aforementioned elements.

In a preferred embodiment, the operation of system 600 is controlled primarily by processor 602 operating under the guidance of programs stored in memory 604. Memory 604 may include both high-speed random-access memory (RAM) and non-volatile memory such as a magnetic disk, flash EEPROM, and/or the like.

As shown in FIG. 6, memory 604 may include a variety of programs or modules for controlling the operation of system 600 and performing the techniques described above in connection with FIGS. 1-5. For example, memory 604 may include a collection of images 629 received from cameras 610, and/or data that has been generated from such images using optical character recognition software 630. Memory 604 also preferably includes a signal processing program 631 for analyzing the three-dimensional data gathered by devices 612 to detect error-conditions or other special conditions. For example, signal processing program 631 may be configured to analyze the gathered data with reference to a nominal three-dimensional model of a properly positioned document, with data that does not conform to the model indicating the presence of an obstruction or other special situation. Memory 604 may also include an operating system 632 for coordinating the operation of the various programs and/or hardware, and for taking action in response to the detection of errors or other special conditions.

One of ordinary skill in the art will appreciate that the systems and methods of the present invention can be practiced with devices and architectures that lack many of the components shown in FIG. 6 and/or that have other components that are not shown. For example, some systems may not include an automatic page turning apparatus 616, a separate group of devices 612 for performing three-dimensional data capture, an automatically controlled lighting mechanism 614, and/or OCR software 630. Other systems may employ mechanisms that are not shown in FIG. 6, such as special-purpose signal processing hardware (e.g., one or more digital signal processing (DSP) chips), and/or the like. In other embodiments, the functionality shown in FIG. 6 could be distributed amongst multiple systems (e.g., image data could be sent to a remote location for application of OCR, indexing, and storage). Thus, it should be appreciated that FIG. 6 is provided for purposes of illustration and not limitation.

As previously indicated, spatial information collected in the manner described above can be used to detect a wide variety of error conditions and special situations. Several examples have been given above. Additional examples include the detection and optional correction of page distortions caused by clamps or other mechanisms used to hold a document in place; detection and optional correction of pages outside the focus range of the imaging camera(s); detection and optional correction of document misalignment on the cradle, detection and optional correction of books that are too large or too small; and detection and optional correction of unusual document surfaces, such as pop-ups or foldouts, to name but a few non-limiting examples. Depending on the nature of the obstruction and/or error that is detected, in some embodiments certain automated remedial measures can be employed such as by using software to modify the captured image data and/or by physically correcting the source of the problem. Examples of automated remedial measures include physically adjusting the lighting and/or using software to compensate for shadowing such as may be caused by page warp, mechanically flattening and/or using software to compensate for warped pages, ensuring that recently turned pages have completely settled, adjusting the optical character recognition (OCR) process to compensate for distortions caused by poorly positioned documents or defective document surfaces, controlling the focus of the imaging camera to compensate for abnormally large or small documents, controlling the position of a motorized document holding cradle, determining when to take special actions like firing a high-definition camera or flash, and/or driving a statistically controlled quality control process by identifying "troubled" pages.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A document scanning system, comprising:
a first camera for capturing an image of a document;
a second device for gathering data regarding the first camera's field of view at the time of image capture; and
signal processing logic configured to analyze the data relating to the first camera's field of view and to determine whether the first camera's view of the document was obstructed, the signal processing logic further configured to perform a comparison of the data gathered by the second device to data representing a modeled bound document and a region between the surface of the modeled/bound document and the first camera, and configured to determine the quality of the image captured by the first camera based at least in part on the results of the comparison.

2. The document scanning system of claim 1, wherein the second device comprises a scanning range-finder laser.

3. The document scanning systems of claim 1, wherein the second device comprises a second camera and wherein the signal processing logic utilizes data from the first and the second cameras to analyze the data relating to the first camera's field of view and to determine whether the first camera's view of the document was obstructed.

4. The document scanning system of claim 1, further comprises a third device for gathering data relating to the first camera's field of view at the time of image capture, wherein the second device and third device comprise cameras.

5. The document scanning system of claim 1, further comprising a third device for gathering data relating to the first camera's field of view at the time of image capture, wherein the second device and the third device comprise laser range finders.

6. The document scanning system of claim 1, further comprising a third device for gathering data regarding the first camera's field of view at the time of image capture, wherein the second device and the third device comprise ultrasonic range finders.

7. The document scanning system of claim 1, wherein the second device comprises a camera positioned to capture an edge-view of the document.

8. The document scanning system of claim 7, wherein the signal processing logic is configured to compare the data gathered by the second device with a data model corresponding to a properly positioned document, and to signal detection of an error condition if the data gathered by the second device diverge from the data model by more than a predefined amount.

9. The document scanning system of claim 1, wherein the signal processing logic is configured to compare the data gathered by the second device with a data model corresponding to a properly positioned document, and to signal detection of an error condition if the data gathered by the second device diverge from the data model by more than a predefined amount.

10. A method for scanning bound documents, the method comprising the steps of:
capturing an image of a document using a camera;
collecting data regarding the region between the document surface and the camera at the time of image capture;
processing the data to detect the presence of obstructions of other conditions that may adversely affect the quality of the image captured by the camera, the processing including comparing the data collected to data representing a modeled bound document and a region between the surface of the modeled bound document and the camera;
determining the quality of the image captured by the camera based at least in part on the results of the comparing; and
taking on or more remedial actions if such an obstruction or other condition is detected.

11. The method of claim 10, wherein the processing step includes comparing the data regarding the region between the document surface and the camera with a data model of the region corresponding to a properly positioned document, and signaling detection of an obstruction or other condition if the data differ from the data model in a predefined manner.

12. The method of claim 10, wherein the one or more remedial actions comprise automatically repositioning the document in relation to the camera to compensate for misalignment detected during said processing step.

13. The method of claim 10, wherein the one or more remedial actions comprise re-capturing an image of the document.

14. The method of claim 10, wherein the one or more remedial actions comprise associating a flag, with the image of the document, the flag identifying the image as being potentially defective.

15. The method of claim 10, wherein the processing detects an adjustment in lighting in the image captured by the camera would be desirable and wherein the one or more remedial actions comprise automatically adjusting the lighting by modifying the captured image of the bound document.

16. The method of claim 10, wherein the processing detects a distortion in the image captured by the camera and wherein the one or more remedial actions comprise automatically correcting the distortion by modifying the captured image of the bound document.

17. A method comprising the steps of:
positioning a bound document on a cradle, the cradle being located in the field of view of a first camera;
using the first camera to capture an image of the bound document;
using at least a second camera to capture an image of the bound document and a region located between the surface of the bound document and the first camera;
comparing the image captured by at least the second camera to image data representing a hypothetical, bound document and a region between the surface of the hypothetical, bound document and the first camera; and
making a determination regarding the quality of the image captured by the first camera, the determination being based at least in part on the results of the comparing step.

18. The method of claim 17, wherein the determination regarding the quality of the image comprises a determination that the bound document was improperly positioned, the method further comprising:
re-positioning the bound document on the cradle; and
using the first camera to capture a second image of the bound document.

19. The method of claim 17, wherein the determination regarding the quality of the image comprises a determination that an obstruction was present in the image, the method further comprising using the first camera to capture a second image of the bound document.

20. The method of claim 17, wherein the determination regarding the quality of the image comprises a determination that an adjustment in lighting would be desirable, the method further comprising automatically effecting the adjustment in lighting by modifying the captured image of the bound document.

21. The method of claim 17, wherein the determination regarding the quality of the image comprises a determination that the image quality is defective, the method further comprising automatically associating a flag with the captured image of the document, the flag identifying the image as being potentially defective.

22. The method of claim 17, wherein the determination regarding the quality of the image comprises a determination that the image quality is distorted, the method further comprising automatically correcting the distortion by modifying the captured image of the bound document.

23. The method of claim 17, further comprising:
using at least a third camera to capture an image of the bound document and a region located between the surface of the bound document and the first camera; and
comparing the image captured by at least the third camera to image data representing a hypothetical, bound document and a region between the surface of the hypothetical, bound document and the first camera,
wherein the determination regarding the quality of the image captured by the first camera is based at least in part on the results of the step of comparing the image captured by at least the third camera to image data representing a hypothetical, bound document and a region between the surface of the hypothetical, bound document and the first camera.

24. The method of claim 17, wherein the second camera is oriented to capture an edge view of the document.

25. The method of claim 17, wherein the second camera is selected from the group consisting of laser range finder, scanning laser range finder, ultrasonic range finder, autofocus range finding technology, binocular camera array, and trinocular camera array.

* * * * *

UNITED STATES PATENT AND TRADEMARK OFFICE
CERTIFICATE OF CORRECTION

PATENT NO. : 7,586,655 B1
APPLICATION NO. : 10/611666
DATED : September 8, 2009
INVENTOR(S) : Christopher Uhlik, Joseph K. O'Sullivan and Marc Levoy It is certified that error appears in the above-identified patent and that said Letters Patent is hereby corrected as shown below:

Column 8, lines 63-64, delete "modeled/bound" and insert -- modeled bound --

Column 9, line 2, delete "range-finder" and insert -- range-finding --

Column 10, line 5, delete "flag," and insert -- flag --

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,586,655 B1 Page 1 of 1
APPLICATION NO. : 10/611666
DATED : September 8, 2009
INVENTOR(S) : Uhlik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1680 days.

Signed and Sealed this

Twenty-first Day of September, 2010

David J. Kappos
*Director of the United States Patent and Trademark Office*